March 5, 1946. J. S. JONES 2,396,047

PUNCH PRESS CLUTCH

Filed Nov. 11, 1944 2 Sheets-Sheet 1

INVENTOR.
JAY S. JONES,
BY
ATTORNEY.

March 5, 1946.   J. S. JONES   2,396,047
PUNCH PRESS CLUTCH
Filed Nov. 11, 1944   2 Sheets-Sheet 2
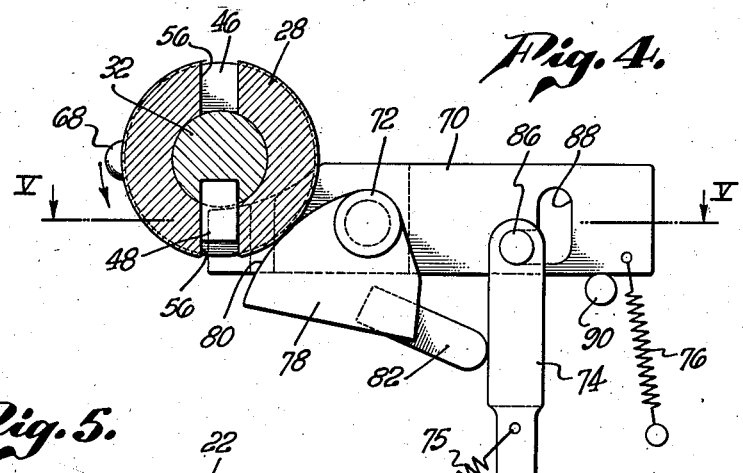
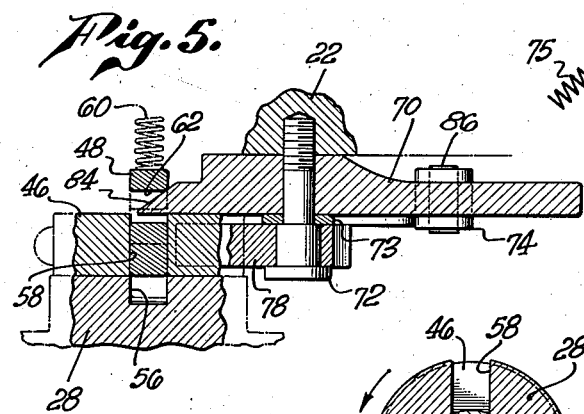
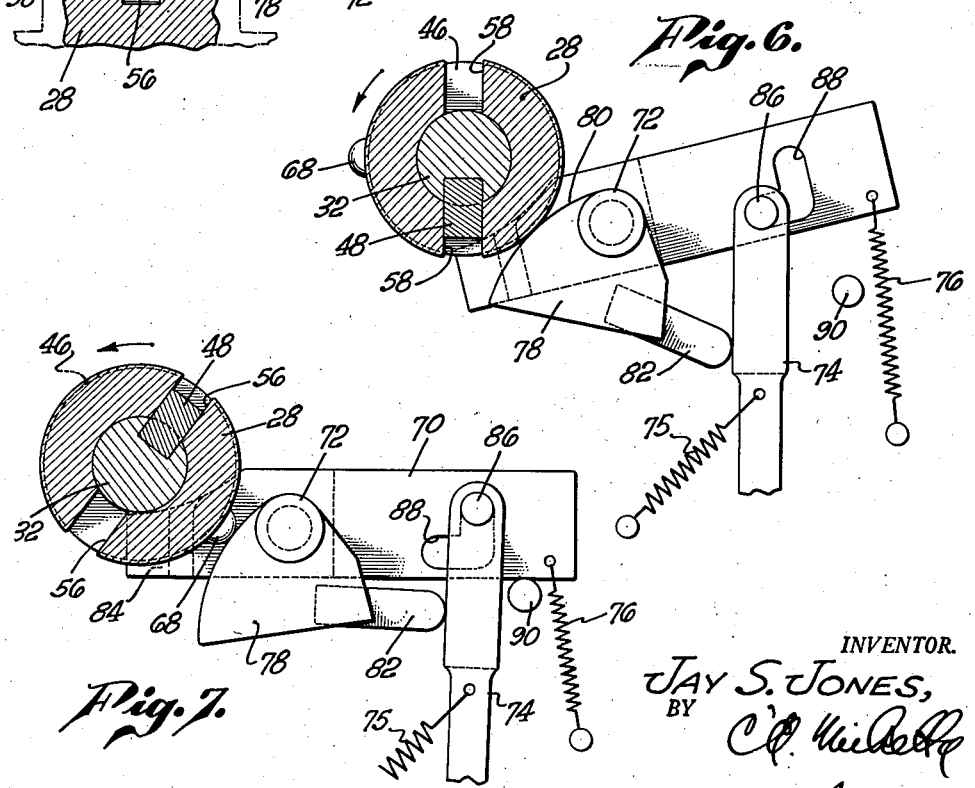
INVENTOR.
JAY S. JONES,
BY
ATTORNEY.

Patented Mar. 5, 1946

2,396,047

UNITED STATES PATENT OFFICE 2,396,047

PUNCH PRESS CLUTCH

Jay S. Jones, Los Angeles, Calif., assignor to Crandell M. Henry and Ernest Dale Resler, jointly, doing business as Jones & Henry Tool Company, Los Angeles, Calif.

Application November 11, 1944, Serial No. 563,021

5 Claims. (Cl. 192—24)

My invention relates to small, power-operated machine tools and particularly tools in which is incorporated a continuously operated fly wheel the momentum of which is utilized to operate some moving part such as a punch.

One embodiment of the invention may be incorporated into a punch press inasmuch as punch presses and machine tools of a like nature must be very rugged in order to stand long periods of service. All of the parts must likewise be kept rugged and made relatively simple so that there is a minimum number of elements which can be worn out or which may get out of order. It is highly essential also that when these parts do finally become worn they can be very readily replaced with a new part fitted in so that no special machine work will be necessary in order to maintain smooth operation of the device. Where one part of a machine tool is continuously operating some means such as a clutch has frequently been employed in the past. Although clutches promote smooth operation for the most part they are rather complex in structure, are expensive to install and when used on a device of the character of a punch press are apt frequently to get out of order and requiring servicing or replacement.

It is therefore among the objects of my invention to provide a new and improved clutch and device for attaching the working parts of a small, compact machine tool to a continuously operating fly wheel so that the momentum of the fly wheel will drive the device through its operating stroke.

Another object of my invention is to provide a new and improved clutch device which will intermittently connect together a continuously operating fly wheel and a drive shaft for a machine tool but which is so arranged that after one operating stroke the fly wheel will be automatically disconnected.

Still another object of my invention is to provide a new and improved intermittent clutch mechanism frequently referred to as a dog clutch which provides a positive connection between a fly wheel and a shaft whenever the clutch device is released for operation by an actuating mechanism but which through an automatic return mechanism disengages the dog clutch after one operation and maintains it in a disengaged condition until the actuating means is reset.

A still further object of my invention is to provide a new and improved compact, pin-type clutch mechanism for connecting a fly wheel to a shaft for a single operation wherein the parts have been reduced to a relatively minimum number and which are constructed in such a manner as to maintain a maximum degree of simplicity.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 4 is a side view partially in section showing the parts in normal position taken on the line IV—IV of Fig. 3.

Fig. 5 is a cross-sectional view taken on the line V—V of Fig. 4.

Fig. 6 is a side view similar to Fig. 4 showing the parts in operating position.

Fig. 7 is a side view similar to Fig. 4 showing the position of the parts following one punch operation before release of the actuator arm.

Figure 1:
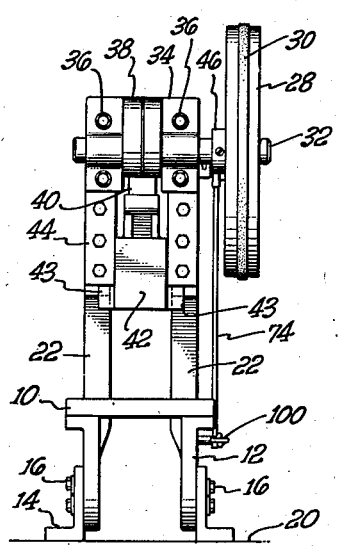
Fig. 1 is a front elevational view of a punch press embodying the invention.

Machine tools and particularly those of the punch press variety are used in the trade to strike heavy blows upon the work. They may be utilized with dies for punching out pieces from sheet metal or perhaps used to perforate metal plates and in some instances, set sleeves, grommets and the like where portions of the metal are riveted over in order to fix them to one type of work piece or another. When material such as steel is used the blows necessary to perform the work required need be exceedingly heavy.

It is not necessary on all occasions to have a large machine to perform these operations but in the event a small machine is used it must be of substantially heavy construction with means provided to give impetus to the blow such as a large fly wheel. The energy stored up in the continuously rotating fly wheel is needed to produce a blow of maximum effectiveness without it being necessary to maintain a power plant of large capacity on the device. Further, in view of the fact that the blows struck by machines of this kind are extremely heavy it has been found desirable to so construct the machine that it will automatically stop after one blow. If this were not the case rapid heavy blows upon a work piece would have a tendency either to damage the work piece or perhaps permanently strain or damage the machine. In view of these heavy operations required of a punch press the mechanism designed to engage the fly wheel with the operating part of the device must be rugged and simple and when provided with an automatic reset or interrupter the automatic part of the device must be of similar rugged construction and not be likely to fail under continued use.

In the embodiment chosen to illustrate my invention there has been provided a work plate 10 supported by tiltable side elements 12 attached to shoes 14 by means of bolts 16 which extend through a slot 18 in the vertical side of the shoe and are secured in side elements 12. The shoes are designed to rest upon a solid surface 20 such as a concrete floor. At the sides of the work plate there are provided columns 22 which extend upwardly at the rear of the work plate and are designed to support the operating parts of the device. At the rear of the columns is a shelf 24 upon which is mounted a motor 26. The motor in turn drives a fly wheel 28 through a V belt drive 30. The fly wheel rotates freely about a shaft 32 which in turn is mounted upon the columns by means of clamps 34 which secure the necessary bearings in place. The clamps are secured to the columns by means of bolts 36. An eccentric 38 is mounted on the mid-portion of the shaft and through a reciprocating piston 40 operates a punch 42 the sides 43 of which slide up and down vertically in a track formed partly by the columns 22 and partly by the plates 44 which are attached to the columns.

Figure 3:
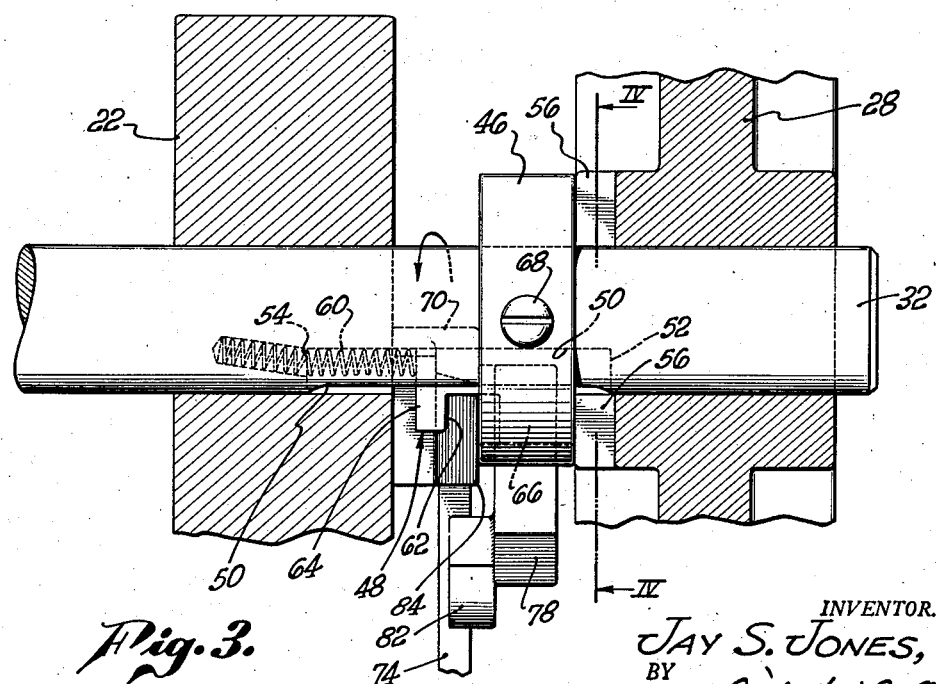
Fig. 3 is a fragmentary, vertical, sectional view showing the hub of the fly wheel and parts of the clutch device drawn to a larger scale.

The invention is embodied chiefly in parts which comprise in addition to the fly wheel 28 a locking ring 46 and a key 48. The shaft 32 is provided with a longitudinal slot or keyway 50 which extends from a position 52 within the hub of the fly wheel to a position 54 which is spaced a substantial distance from the locking ring and as shown in Fig. 3 lies within the righthand column 22 as viewed in Fig. 1. The fly wheel is provided with a recess 56 and the locking ring 46 is provided with slots 58 designed to receive the key 48. As will be noted particularly in Figs. 3 and 5 the key is being constantly urged in a direction from left to right as viewed in Fig. 3 by means of a coiled spring 60 which extends axially relatively to the keyway.

The key is further provided with a slot 62 which has a relatively narrow extension 64 at one side and a relatively wide extension 66 on the other side. A projection 68 is located upon the outer surface of the locking ring at an angular distance from the slot therein which as shown in Fig. 6 is approximately 90°.

To provide for proper intermittent operation of the device and to disengage the key from the fly wheel there is provided a deflector lever 70 pivoted at the point 72 by means of a bolt spaced from the lever by a washer 73 and adapted to be actuated by an arm 74. A coiled spring 75 normally holds the actuating arm in a depressed position downwardly and toward the left as viewed in Figs. 6 and 7. Another spring 76 is designed to normally tend to depress the end of the deflector lever adjacent the spring connection in a downwardly direction. A finger cam 78 is pivotally mounted about the pivotal mounting 72 of the deflector lever and has a cam face 80 at one side and a finger pin 82 at the side opposite from the cam face. The deflector portion of the lever comprises a knife edge 84 which is designed to enter the slot 62 of the key.

In initial or normal position as shown in Fig. 4 the actuator arm 74 has a pivotal mounting 86 in the angular slot 88 in the deflector lever and by reason of the action of spring 75 the pivotal mounting is normally urged toward the lefthand end of the V-shaped slot.

A stop pin 90 is provided in order to limit tilting of the deflector lever beyond a certain point.

Figure 2:
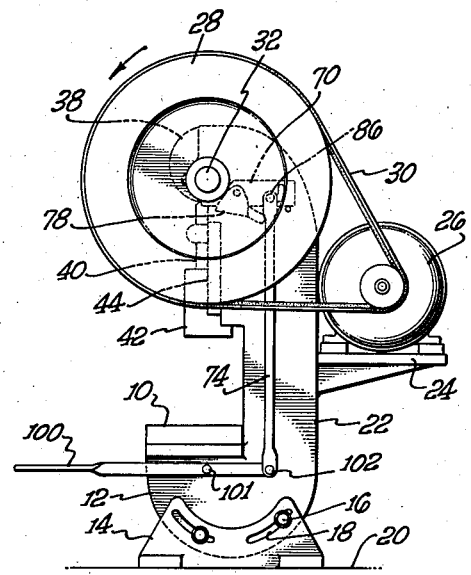
Fig. 2 is a side elevational view of the press.

In operation the motor tends to rotate the fly wheel 28 in a counterclockwise direction as viewed in Fig. 2. During all of this time only the fly wheel is operating, the remaining parts of the machine including the shaft remain stationary as does also the eccentric which is attached to the punch. The pin-type clutch will, under these circumstances, be disengaged. It is further true that the parts in the position just described enable the key to be slid from right to left as viewed in Fig. 3 to a point where the deflector 84 will have an opportunity to pass through the lateral slot in the key.

As long as this condition prevails the deflector will always urge the key toward the left as viewed in Fig. 3 and by that means maintain it out of locked relationship with the fly wheel.

When it is desired to operate the device it is necessary only to tilt the lever 70 in a counterclockwise direction as viewed in Fig. 6. This tilting of the lever is sufficient to tilt the knife edge 84 out of its contact within the slot in the keyway. This means that upon the next revolution of the flywheel the spring 60 will urge the end of the key identified by the character 66 from left to right into a position where it is received in the recess 56 in the fly wheel and thereby establish a connection between the fly wheel and the shaft. Under these circumstances the key will be pushed clear to the end 52 of the keyway. After the connection has thus been established the fly wheel will then rotate one complete revolution thereby enabling the punch to operate with a relatively heavy blow. Since one blow at a time is all that is needed means are provided to interrupt the punch after one movement.

These means incorporate the finger cam 78 together with the cam face 80 and the finger 82. It should be borne in mind that the upper end of the actuating arm 74 has its pivotal connection 86 at the lefthand end of the angular slot 88. The position shown in Fig. 4 illustrates the relationship of the parts while the deflecting lever is set so that a deflecting end is received into the slot 62 of the keyway thus maintaining the key customarily out of engagement with the fly wheel.

The actuating arm is shifted by depression of a foot pedal 100 pivoted at 101 and secured by a loose joint 102 to the actuating arm. When the foot pedal is depressed the actuating arm is lifted upwardly by reason of the pivot 101 being placed between the foot pedal and the joint. When the actuating arm is lifted upwardly it assumes a position such as that shown in Fig. 6. This means that the knife edge or deflector end of the lever is moved out of its path of alignment with the slot 62 in the key. When this occurs the spring 60 will urge the key in a direction from left to right as viewed in Fig. 3 until the key is pushed to the end 52 of the key slot wherein it engages a recess 56 in the hub of the fly wheel. When this has occurred the fly wheel is keyed to the shaft and the shaft will be rotated by the fly wheel. During all of this movement the key remains positioned within a slot 58 in the locking ring so that the locking ring always rotates with the shaft.

After this engagement has taken place, as the locking ring continues to rotate the projection 68 travels around in a counterclockwise direction from the position shown in Fig. 6 to the position shown in Fig. 7. When the projection reaches the position shown in Fig. 7 it contacts the cam face 80 and rotates the finger cam in a counterclockwise direction about its pivot 72. When this occurs the finger 82 presses laterally against the actuating arm 74 and kicks it from one end of the angular slot to the other. When the actuating arm has been thus moved the spring 76 will draw the end of the lever downwardly until it abuts stop pin 90 at which point the end of the actuating arm will have advanced completely into the other end of the angular slot. This motion will return the deflector lever to its initial position even though the actuating arm remains in a depressed position. As a result the deflector or knife edge at the end of the deflector lever will again be positioned in alignment with the slot in the key and as the key rotates it will be kicked out of engagement with the recess in the fly wheel and the shaft will no longer be driven by the fly wheel. This relationship will continue as long as the actuator arm is in the position last described so that there will be no further movement of the punch which is driven by the shaft through the eccentric after the first blow.

When the actuator arm is released the spring 75 will draw the arm downwardly so that the end within the angular slot passes downwardly and then from right to left by reason of the bias of the spring so that the actuator arm will return to the initial position shown in Fig. 4. During this movement the deflector lever will remain in the position shown in Fig. 4 by reason of the righthand end's being held downward by the spring 76. This means that after the actuator arm has been released there will still be no drive connection between the fly wheel and the shaft and no further operation of the punch. To again operate the punch for a single blow it is necessary to again move the actuator arm as previously described.

There has thus been provided a simple, positive clutch device for a fly wheel actuated machine tool such as a punch press which is adapted to engage the working parts of the press with the fly wheel for a single operating stroke and thereafter release them regardless of the position of an actuating pedal, the parts being reduced to a very simple form and made sufficiently rugged so that they will withstand the excessive wear currently present in tools of this variety.

I claim:

1. In a machine having a freely rotatable wheel mounted on a shaft, the combination of a clutch device for connecting the wheel to the shaft comprising a rotatable member on the shaft, a key slidably axially upon the shaft and extending slidably relative to the rotatable member for fixing said member in non-rotatable relationship to the shaft, said key being normally spring pressed toward the fly wheel and said fly wheel having means thereon adapted to engage the adjacent end of the key, a lever having a deflector normally spring pressed to a position engaging the key upon rotation of said key, and an actuating arm having a compound sliding attachment to the lever normally pivoted at one part of the attachment and adapted to be shifted and thereby tilt the deflector of the lever out of engaging position with the key, a trip member on the lever adapted to engage a portion of the rotatable member and an element of the trip member having contact with the actuating arm, said element having a position adapted to shift the location of the actuating arm to another part of the attachment thereof upon engagement of the said portion of the rotatable member with said trip member whereby the deflector automatically returns to a position adapted to disengage the key from the fly wheel prior to release of the actuating arm.

2. In a punch press having a frame, a fly wheel and a laterally extending supporting shaft therefor, the combination of a clutch device for connecting the fly wheel to the shaft comprising a rotatable member on the shaft adjacent the fly wheel, a keyway in the shaft extending from a point adjacent the fly wheel through the rotatable member, a key slidably positioned within the keyway and the rotatable member for fixing said rotatable member non-rotatably to the shaft, said key being provided with a transverse slot and being normally spring pressed toward the fly wheel and said fly wheel having means thereon adapted to engage the adjacent end of the key, a lever pivotally mounted upon the frame having a deflecting portion at one end normally spring pressed to a position engaging the key upon rotation of said key, and a spring depressed actuating arm having a compound sliding connection with the lever normally pivoted at one portion of the connection and adapted to be lifted and thereby tilt the deflecting portion of the lever out of engaging position with the slot, a trip member on the lever being adapted to engage a portion of the rotatable member and an element thereof in contact with the actuating arm, said element having a position adapted to shift the position of the actuating arm to another portion of the connection upon engagement of the said portion of the rotatable member with said trip member whereby said deflecting portion automatically returns to a position adapted to disengage the key from the fly wheel prior to release of the actuating arm.

3. In a punch press having a frame, a fly wheel and a laterally extending supporting shaft therefor, the combination of a clutch device for connecting the fly wheel to the shaft comprising a locking ring on the shaft adjacent the fly wheel having a projection thereon, a keyway in the shaft extending from a point adjacent the fly wheel through the ring, a key slidably postioned within the keyway and the ring for fixing said ring non-rotatably to the shaft, said key being provided with a slot and being normally spring pressed toward the fly wheel and said fly wheel having means thereon adapted to engage the adjacent end of the key, a lever pivotally mounted upon the frame having a deflecting portion at one end normally spring pressed to a position engaging the key upon rotation of said key, and a spring pressed actuating arm having a compound sliding connection with the lever normally pivoted at one portion of the connection and adapted to be shifted and thereby tilt the deflecting portion of the lever out of engaging position with the slot, a finger cam pivotally mounted on the lever having a cam face adapted to engage the projection and a finger thereon in lateral contact with the actuating arm, said finger having a position adapted to shift the position of the actuating arm to another portion of the connection upon engagement of the locking ring projection with the cam face whereby said deflecting portion automatically returns to a position adapted to disengage the key from the fly wheel prior to release of the actuating arm.

4. In a punch press having a frame, a fly wheel and a laterally extending supporting shaft therefor, the combination of a pin clutch for connecting the fly wheel to the shaft comprising a locking ring on the shaft adjacent the fly wheel having a projection thereon, a keyway in the shaft extending from a point adjacent the fly wheel through the ring to a point spaced therefrom, a key slidably positioned within the keyway and the ring for fixing said ring non-rotatably to the shaft, said key being provided with a transverse slot and being normally spring pressed toward the fly wheel and said fly wheel having a recess therein adapted to receive the adjacent end of the key, a lever pivotally mounted upon the frame having a knife edge at one end normally spring pressed to a position engaging the key upon rotation of said key, said lever having an angular slot at the other end and a spring pressed actuating arm having a pivotal connection to the lever normally at one end of the angular slot and adapted to be shifted and thereby tilt the knife edge of the lever out of engaging position with the transverse key slot, a finger cam pivotally mounted on the lever having a cam face adapted to engage the projection and a finger thereon in lateral contact with the actuating arm, said finger having a position adapted to shift the pivotal connection of the actuating arm to the other end of the angular slot upon engagement of the locking ring projection with the cam face whereby said knife edge automatically returns to a position adapted to disengage the key from the fly wheel prior to release of the actuating arm.

5. In a punch press having a frame, a horizontally mounted fly wheel and a laterally extending supporting shaft therefor, the combination of a pin clutch for connecting the fly wheel to the shaft comprising a locking ring on the shaft adjacent the fly wheel having a projection thereon, a keyway in the shaft extending from a point within the hub of the fly wheel through the ring to a point remote therefrom, a key slidably positioned within the keyway and the ring for fixing said ring non-rotatably to the shaft, said key being normally spring pressed toward the fly wheel and said fly wheel having a recess therein adapted to receive the adjacent end of the key, a laterally extending slot in the key, a lever pivotally mounted upon the frame having a knife edge at one end normally spring pressed to a position receivable into the slot in the key upon rotation of said key, said lever having an angular slot at the other end and a spring depressed actuating arm having a a pivotal connection to the lever normally at one end of the angular slot and adapted to be lifted and thereby tilt the knife edge of the lever out of engaging position with the slot, a finger cam pivotally mounted on the lever having a cam face adapted to engage the projection and a finger thereon in lateral contact with the actuating arm, said finger having a position adapted to shift the pivotal connection of the actuating arm to the other end of the angular slot upon engagement of the locking ring projection with the cam face whereby said knife edge automatically returns to a position adapted to disengage the key from the fly wheel prior to release of the actuating arm.

JAY S. JONES.